(No Model.) 2 Sheets—Sheet 1.

W. SCOTT.
SLOW CLOSING VALVE FOR FLUSHING TANKS.

No. 547,503. Patented Oct. 8, 1895.

Witnesses
Jas. J. Maloney
M. E. Hill

Inventor
William Scott
by Jno. P. Livermore
Att'y (No Model.) 2 Sheets—Sheet 2.
W. SCOTT.
SLOW CLOSING VALVE FOR FLUSHING TANKS.
No. 547,503. Patented Oct. 8, 1895.
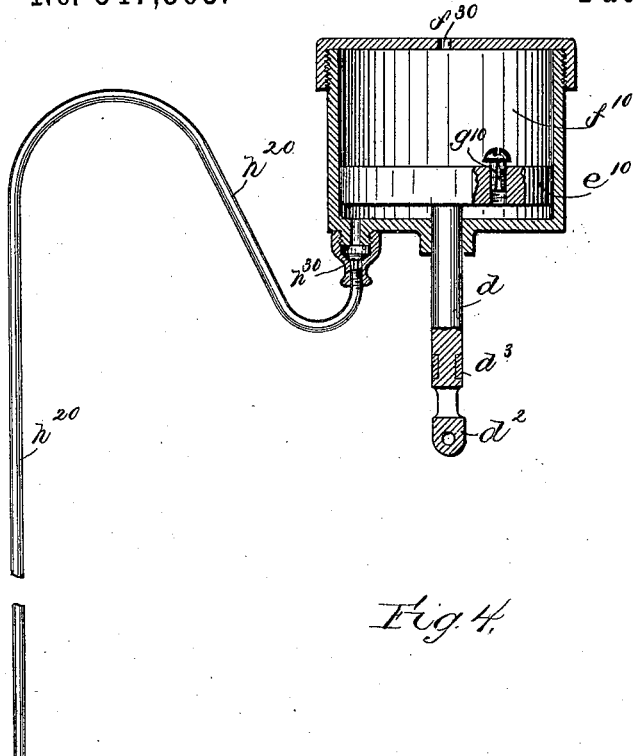
*Fig. 4.*
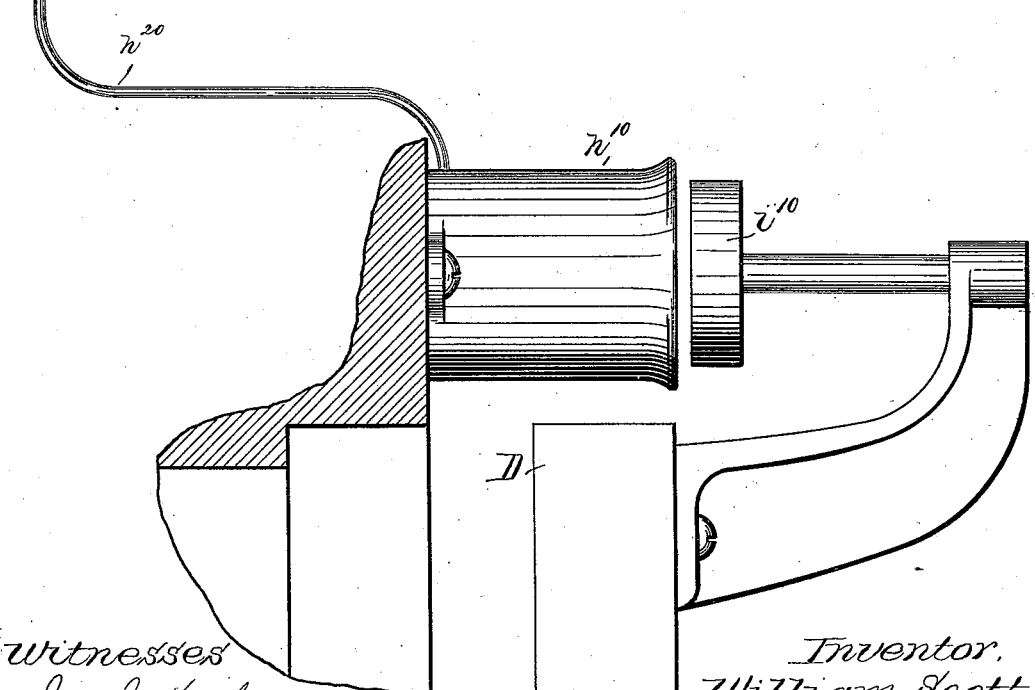
Witnesses
Jas. J. Maloney
H. E. Hill
Inventor,
William Scott,
by Jno. P. Livermore
Att'y

UNITED STATES PATENT OFFICE.

WILLIAM SCOTT, OF MEDFORD, ASSIGNOR TO THE DALTON-INGERSOLL COMPANY, OF BOSTON, MASSACHUSETTS.

SLOW-CLOSING VALVE FOR FLUSHING-TANKS.

SPECIFICATION forming part of Letters Patent No. 547,503, dated October 8, 1895.

Application filed April 28, 1892. Serial No. 431,034. (No model.)

*To all whom it may concern:*

Be it known that I, WILLIAM SCOTT, of Medford, county of Middlesex, State of Massachusetts, have invented an Improvement in Slow-Closing Valves for Flushing-Tanks, of which the following description, in connection with the accompanying drawings, is a specification, like letters on the drawings representing like parts.

My invention relates to a valve and means for operating the same, by which the valve, when opened, will be caused to occupy a considerable interval of time in closing, so that the flow of water from the tank will continue after the valve has been opened.

The valve proper may be of any suitable kind, and is shown as a flap-valve of the usual construction, consisting, essentially, of a hinged cover for an opening into the discharge-pipe of the tank, said cover normally seating tightly on the said opening, so as to prevent the flow of water therethrough.

The valve is operated by an actuator working in an air-chamber by the variation in pressure of the air upon it, said actuator being either a diaphragm or piston, preferably the former, working in a suitably-shaped diaphragm chamber or cylinder and operated either by exhausting the air at one side thereof or by compressing the air at the other side. The change in air-pressure may be produced automatically or otherwise at a point more or less remote from the valve and its actuator, various devices being suitable for this use, it being necessary only to produce a suction or exhaust of air, or a compression of the air by a suitable cylinder and piston or equivalent device, communicating by suitable pipe or duct with the valve-actuating chamber. After the valve has been opened by the change in pressure of the air it is closed by the action of gravity, the valve being so weighted as to tend to drop to its seat, and the time occupied in closing may be regulated by governing the flow of air through a suitable vent-passage connecting the interior of the air-chamber with the external air.

Figure 1:
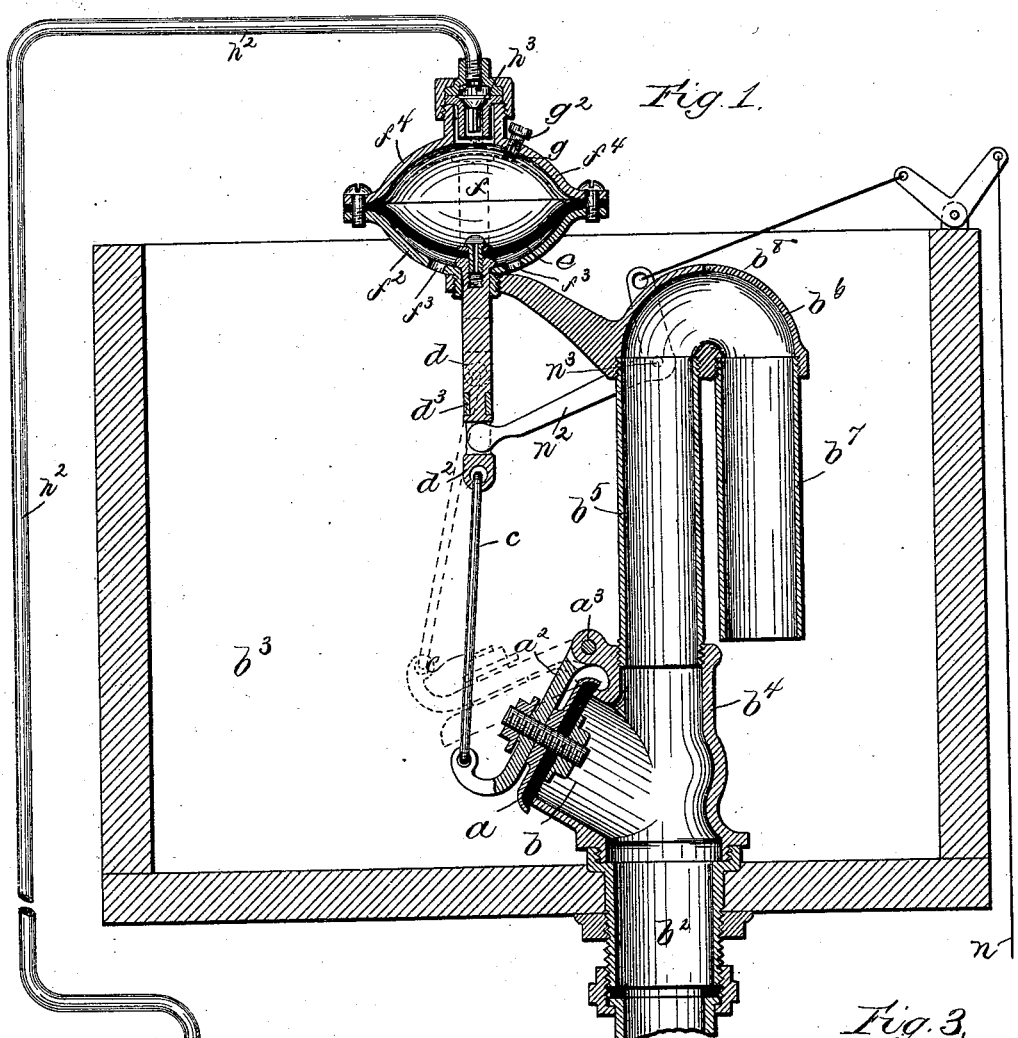
Figure 2:
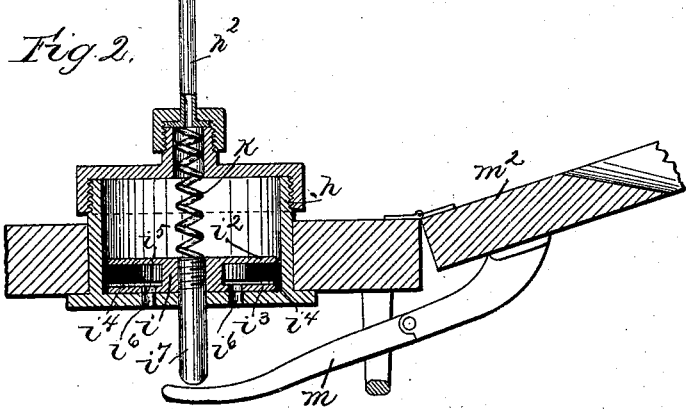
Figure 3:
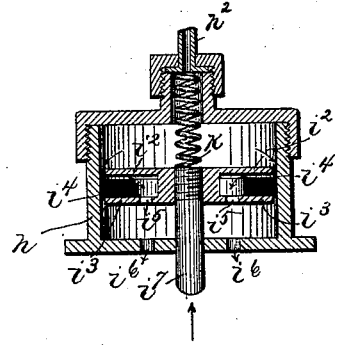

Figure 1 is a vertical section of a flushing-tank provided with a valve and actuating mechanism therefor embodying this invention; Fig. 2, a vertical section of an air-exhausting device which may be employed to operate the valve-actuator by exhaustion of the air from the air-chamber at one side of said actuator, said exhausting device being shown in the position occupied at the end of its effective stroke by which the air is exhausted; Fig. 3, a similar section of an exhausting device, showing the parts in the position occupied while making the stroke preparatory to the effective exhausting stroke; and Fig. 4, a sectional elevation showing a modified construction of the valve-operating apparatus.

The valve proper $a$, Fig. 1, may be of any suitable or usual construction, being shown as a cover which seats over the inlet-opening $b$ to the discharge-pipe $b^2$ from the flushing tank or reservoir $b^3$, said opening in the discharge-pipe being located near the bottom of the tank or at some distance below the normal water-level therein, so that the water will flow out freely when the valve is open. The casting $b^4$, in which the opening and valve-seat $b$ is formed, is shown in this instance as provided with an upwardly-extended pipe $b^5$, which operates as an overflow-pipe for the tank and is shown in this instance as connected at its upper end with a reverse bend $b^6$, having an open-ended downward branch $b^7$ extending somewhat below the level to which the liquid is commonly drawn by the normal action of the valve $a$. The bend $b^6$ is provided with a slight vent $b^8$, which prevents the overflow-pipe $b^5$ $b^6$ $b^7$ from acting as a siphon, and the purpose of extending the reverse bend of the overflow-pipe to a point below the water-level is to seal its end, so that there will not be a large amount of air drawn in through the overflow-pipe by the flow of liquid through the valve-seat and into the discharge-pipe $b^2$ when the valve is nearly closed, as would take place if the overflow-pipe $b^5$ were simply a vertical pipe open at its upper end at the point of highest level for the liquid in the tank, and it is obvious that this operation of the overflow does not depend upon the specific construction of the tank-valve $a$ and its operating apparatus.

The valve proper $a$ is connected with an arm $a^2$, pivoted or hinged at $a^3$ upon the casting $b^4$, and connected at its free end by a suitable link $c$ with the stem $d$ of the valve-actuating device $e$, which is shown in Fig. 1 as a flexible diaphragm—for example, a sheet of soft rubber working in a suitable air-chamber $f$. The end $d^2$ of the stem $d$, which is connected with the link $c$, is shown as having a swivel connection at $d^3$ with the portion of the stem $d$ that is connected directly with the diaphragm $e$. The lower wall $f^2$ of the air-chamber containing the diaphragm is provided with large openings $f^3$, so that the pressure between the said lower wall and the under surface of the diaphragm is always substantially the same as the atmospheric pressure and does not interfere with the free movement of the diaphragm in its chamber. The lower wall is merely a support for the diaphragm and upper wall $f^4$, the space between which is the actual air-chamber. The upper wall $f^4$ of the said chamber is substantially tight, except for a small vent-passage, shown in this instance as adjustable, being afforded by a V-shaped longitudinal notch $g$ in a screw $g^2$ which, except for the said notch, screws tightly into a threaded opening in the upper wall $f^4$ of the air-chamber. The said notch $g$ grows wider and deeper toward the point of the screw, vanishing to nothing at a point slightly below the head of the screw, so that by turning the screw outward the effective area of the vent-passage is increased, and by turning the screw inward the vent-passage is diminished and may thus be regulated as desired.

If the diaphragm $e$ should be moved up nearly to the upper wall $f^4$ of the chamber, as shown in dotted lines, Fig. 1, and the air should be substantially exhausted from the upper part of the chamber, the valve $a$ would be opened in such movement of the diaphragm and would be sustained in open position by the atmospheric pressure on the under surface of the diaphragm and would close only in proportion as the air entered the upper part of the diaphragm-chamber through the vent-passage $g$, so as to balance the atmospheric pressure on the under side of the diaphragm, and consequently the parts thus far described will constitute a slow-closing valve, whatever means may be employed to open the valve and exhaust the air from the upper part of the diaphragm-chamber.

A suitable device for exhausting the air from the diaphragm-chamber and thus operating the valve $a$ is represented in Fig. 2, the same consisting of a cylindrical chamber $h$, containing a piston $i$, of peculiar construction, to be hereinafter described, which is actuated toward and normally held at the bottom of the cylinder by a spring $k$. The said cylinder $h$ is connected with the diaphragm-chamber $f$ by a pipe $h^2$, and a check-valve $h^3$ (see Fig. 1) is provided where the said pipe enters the diaphragm-chamber, the said check-valve opening outwardly with relation to the diaphragm-chamber and thus preventing the entrance of air to the chamber from the pipe, but permitting the free escape of air from the chamber into the pipe.

The mode of operation of the piston $i$ of the exhausting device is illustrated in Figs. 2 and 3, the said piston being composed of two disks or plates $i^2\ i^3$, the former of which is of slightly smaller diameter than the bore of the cylinder or is otherwise shaped to leave a space between its periphery and the wall of the cylinder or otherwise afford a passage near the periphery of said disk for the free movement of air, as indicated by the arrows, Fig. 3. Between the said disks is confined an annulus $i^4$ of rubber or similar elastic material, which is of sufficient diameter to press outward to a working fit in the wall of the cylinder $h$; but is somewhat thinner than the space between the two disks $i^2\ i^3$, as clearly shown in Figs. 2 and 3, so that when the ring is against one of said disks—as, for example, disk $i^3$, as shown in Fig. 3—there is sufficient space between the opposite side of the ring and the adjacent face of the other disk, as $i^2$, to permit the free passage of air between the disk and the ring, as shown by the arrows, Fig. 3. The lower disk $i^3$ is provided with vent-openings $i^5$ sufficient to permit the air to flow freely through them and the bottom or under head of the cylinder is also provided with openings $i^6$ sufficient to permit the free escape of air. The result of this construction is that the disks have a slight movement in the cylinder with relation to the ring and when the piston is moved upward by its operating-rod $i^7$, as indicated by the arrow, Fig. 3, the ring $i^4$, owing to its friction with the inner wall of the cylinder, does not move until engaged by the lower disk $i^3$ of the piston, and there is thus a free passage for the air in the cylinder above the piston, around the edges of the upper disk $i^2$, between the said disk and the ring $i^4$, and thence through the openings $i^5\ i^6$, as indicated by the arrows, Fig. 3, so that in the upward stroke of the piston there is no tendency to compress the air into the pipe $h^2$, but the air passes freely by the piston and into the part of the cylinder below the piston. In this movement the spring $k$ is compressed, and when the rod $i^7$ is released the said spring forces the piston downward, in which operation the disk $i^2$ bears against the ring $i^4$, and thus prevents the passage of air between the said ring and disk, as will be understood from Fig. 2, so that on the downstroke of the piston it tends to exhaust the air from the pipe $h^2$, and thus from the diaphragm-chamber $g$, causing the diaphragm to be moved up to the dotted-line position, Fig. 1, by the atmospheric pressure on its under surface, and thus opening the valve $a$, which latter then closes as rapidly as the air enters the diaphragm-chamber through the vent-passage $g$, as before described. The essential function of the lower end of the cylinder is merely to guide the rod $i^7$, and to limit the downward movement of the piston, and the essential function of the lower disk $i^3$ is merely to move the ring $i^4$ upward while disengaged from the disk $i^2$, and these parts may be of any shape or construction that will fulfill these requirements. The annular space around the disk $i^2$ is really an air-passage, which is controlled by the ring $i^4$, which operates as a valve to open said passage in the upward or idle stroke of the piston, and to close it in the downward or effective stroke, and the said air-passage may be provided in any suitable or convenient way, the reduction of the diameter of the disk being, however, a simple and efficient way of providing such air-passage.

The exhausting apparatus may be operated by hand, using the stem $i^7$ as a push-button, or it may be operated by foot, or by placing the stem under a platform to be stepped upon, or it may be operated automatically by the seat-lever $m$, as shown in Fig. 2, which may be of usual construction and connected with the seat $m^2$ for automatic operation in the well-known manner, as commonly employed for the operation of flushing-valves for water-closets, in which the said seat-lever is usually connected mechanically with the valve-operating mechanism at the tank.

The valve apparatus shown in Fig. 1 is also shown as provided with means for opening a valve without the pneumatic action by an ordinary pull-chain $n$, which connects with one arm of an elbow-lever $n^2$, pivoted at $n^3$ on the casting that supports the air-chamber, said arm entering the slot in the swivel-piece $d^2$, so that when the chain $n$ is pulled down the valve-stem and diaphragm are raised. In this operation the diaphragm itself will force the air from the air-chamber $f$, through the check-valve $h^3$, the pipe $h^2$, and cylinder $h$ being sufficient to receive the air forced out from the chamber $f$ with but little compression thereof, and the check-valve $h^3$ will prevent the return of the air into the chamber, so that the diaphragm will descend and the valve come to its seat only as permitted by the entrance of air through the vent-passage $g$.

The apparatus shown in Fig. 1, in which the diaphragm is employed as the valve-actuator, is believed to be the most efficient and the simplest, but it is obvious that other constructions may be employed as a substantial equivalent therefor—as, for example, a piston and cylinder may be substituted for the diaphragm and its chamber—and the valve-actuator, whether piston or diaphragm, may be operated either mechanically as by the lever $n^2$ or pneumatically, either by the exhaustion of air at one side, as illustrated in Fig. 1, or by compression of air at the other side without departing from the essential features of the invention, which consist mainly in the employment of the vented air-chamber, in conjunction with the piston or diaphragm as a retarder to govern the time occupied by the valve in closing.

A modified construction is illustrated in Fig. 4, in which the valve-actuator $e^{10}$ is a piston, and the air-chamber $f^{10}$ a cylinder in which the said piston works, and as shown in this construction the upper part of the cylinder is open or provided with an air-outlet $f^{30}$ sufficient to prevent any substantial variation from the atmospheric pressure upon the upper side of the piston $e^{10}$, while the lower portion of said air-chamber is connected with the air-pipe $h^{20}$, through which air passes to operate the valve-actuator $e^{10}$. As shown in this instance, the valve-actuator or piston $e^{10}$ is operated by forcing the air into the chamber through the pipe $h^{20}$, which is provided with an inwardly-opening check-valve $h^{30}$, corresponding in function to the outwardly-opening check-valve $h^3$ of Fig. 1, the forcing of air through the pipe $h^{20}$ raising the check-valve, so that the air passing into the cylinder below the piston $e^{10}$ raises the latter and thus opens the tank-valve $a$, and inasmuch as the egress of the air through the pipe $h^{20}$ is prevented by the valve $h^{30}$ the descent of the piston is regulated by the egress of the air through the vent-passage $g^{10}$, which may be of the same construction as the vent-passage $g$ of Fig. 1, and may be either in the piston $e^{10}$ itself or in the lower part of the cylinder.

As shown in Fig. 4, the valve is arranged to be automatically operated upon the closing of a door D, which carries the piston $i^{10}$ that enters a cylinder $h^{10}$ as the door closes, thus checking the momentum of the door and preventing slamming, and at the same time causing the air to be expelled from the cylinder $h^{10}$ through the pipe $h^{20}$ into the air-chamber $f^{10}$ to operate the valve, as has been described, and it is obvious that any suitable air compressing or exhausting apparatus may be employed to operate the pneumatic actuator for the tank-valve.

I claim—

1. In a slow-closing valve apparatus, the combination of a flap-valve $a$, a diaphragm $e$ with which said flap valve is connected, an air chamber $f$ in which the diaphragm is arranged and exposed on one side to atmospheric pressure, a graduated air inlet device arranged in the air chamber on the other side of the diaphragm, an air exhausting device, a check-valve arranged between the air exhausting device and the chamber and controlling communication between them, and means to actuate said air-exhausting device, substantially as described.

2. In a slow-closing valve apparatus, the combination of a flap-valve $a$, a diaphragm $e$ with which said flap valve is connected, an air chamber $f$ in which the diaphragm is arranged and exposed on one side to atmospheric pressure, a graduated air inlet device arranged in the air chamber on the other side of the diaphragm, an air exhausting device, a check-valve arranged between the air-exhausting device and the chamber and controlling communication between them, the said air-exhausting device comprising a cylinder, a piston therein having the imperforate upper disk $i^2$ of less diameter than the bore of the cylinder, the perforate disk $i^3$, and the interposed packing ring $i^4$ fitting the bore of the cylinder and of less thickness than the space between the two disks, the disk $i^2$ having a movement independent of the packing ring and the ring being dependent upon one or the other of said disks for its further movement, substantially as described.

In testimony whereof I have signed my name to this specification in the presence of two subscribing witnesses.

WILLIAM SCOTT.

Witnesses:
JOS. P. LIVERMORE,
M. E. HILL.